(12) United States Patent
Hayashi (10) Patent No.: US 9,831,748 B2
(45) Date of Patent: Nov. 28, 2017

(54) ROTATIONAL ELECTRIC MACHINE

(71) Applicant: DENSO CORPORATION, Kariya, Aichi-pref. (JP)

(72) Inventor: Jirou Hayashi, Ama (JP)

(73) Assignee: DENSO CORPORATION, Kariya (JP)

( * ) Notice: Subject to any disclaimer, the term of this patent is extended or adjusted under 35 U.S.C. 154(b) by 231 days.

(21) Appl. No.: 14/617,055

(22) Filed: Feb. 9, 2015

(65) Prior Publication Data
US 2015/0236570 A1    Aug. 20, 2015

(30) Foreign Application Priority Data

Feb. 18, 2014   (JP) .................................. 2014-28498

(51) Int. Cl.
| | | |
|---|---|---|
| *H02K 11/00* | (2016.01) | |
| *H02K 3/50* | (2006.01) | |
| *H02K 5/10* | (2006.01) | |
| *H02K 11/33* | (2016.01) | |

(52) U.S. Cl.
CPC .......... *H02K 11/0073* (2013.01); *H02K 3/50* (2013.01); *H02K 5/10* (2013.01); *H02K 11/33* (2016.01)

(58) Field of Classification Search
CPC . H02K 11/00; H02K 5/10; H02K 5/22; H02K 3/50; H02K 11/33; H02K 5/225
USPC ............................................. 310/45, 71, 68
See application file for complete search history.

(56) References Cited

U.S. PATENT DOCUMENTS

| | | |
|---|---|---|
| 2009/0155101 A1 | 6/2009 | Fukasaku et al. |
| 2010/0327677 A1 | 12/2010 | Iwai et al. |
| 2011/0031851 A1 | 2/2011 | Uryu et al. |

(Continued)

FOREIGN PATENT DOCUMENTS

| | | |
|---|---|---|
| JP | 2009-248864 | 10/2009 |
| JP | 2009248864 A | * 10/2009 |

(Continued)

OTHER PUBLICATIONS

JP 2009248864 Description, English translatiom.*

(Continued)

*Primary Examiner* — Michael Andrews
*Assistant Examiner* — Noli Manaloto
(74) *Attorney, Agent, or Firm* — Nixon & Vanderhye PC (57) ABSTRACT

A stator is disposed inside a motor case having a cylindrical shape. A winding wire is wound around the stator. A rotor is rotatably disposed inside the stator. A shaft is disposed in a rotational center of the rotor. A first plate covers one side of the motor case. The first plate rotatably supports one end portion of the shaft. A second plate has an insert hole extending in a thickness direction of the second plate. The second plate covers an other side of the motor case and rotatably supports an other end portion of the shaft. A wire extending portion has one end electrically connected to the winding wire. The wire extending portion extends from the winding wire and is inserted into the insert hole. A controller is disposed on a side of the second plate opposite to the motor case. The controller includes a substrate and is electrically connected to an other end of the wire extending portion at a side of the substrate opposite to the second plate to control energization to the winding wire.

15 Claims, 7 Drawing Sheets

(56) References Cited

U.S. PATENT DOCUMENTS

| | | | |
|---|---|---|---|
| 2012/0229005 A1* | 9/2012 | Tominaga | B62D 5/0406 |
| | | | 310/68 B |
| 2013/0187517 A1* | 7/2013 | Asao | H02K 1/185 |
| | | | 310/68 D |
| 2013/0257232 A1 | 10/2013 | Tomizawa et al. | |
| 2013/0258879 A1 | 10/2013 | Soumiya et al. | |
| 2014/0125173 A1 | 5/2014 | Hayashi | |

FOREIGN PATENT DOCUMENTS

| | | | |
|---|---|---|---|
| JP | 2010-104212 | | 5/2010 |
| JP | 2010104212 A | * | 5/2010 |
| JP | 2012-110176 | | 6/2012 |
| JP | 2012110176 A | * | 6/2012 |
| JP | 2012-197051 | | 10/2012 |
| JP | 2013-90377 | | 5/2013 |
| JP | 5414869 | | 11/2013 |
| JP | 2015-89298 | | 5/2015 |

OTHER PUBLICATIONS

JP 2010104212 Description, English translation.*
JP 2012110176 Description, English translation.*
Office Action (3 pages) dated Mar. 1, 2016, issued in corresponding Japanese Application No. 2014-028498 and English translation (4 pages).

\* cited by examiner

ROTATIONAL ELECTRIC MACHINE

CROSS REFERENCE TO RELATED APPLICATION

This application is based on and incorporates herein by reference Japanese Patent Application No. 2014-28498 filed on Feb. 18, 2014.

TECHNICAL FIELD

The present disclosure relates to a rotational electric machine integrally having a motor and a controller.

BACKGROUND

Conventionally, a rotational electric machine integrally having a motor and a controller for controlling energization to a winding wire of the motor has been used. For example, a Patent Literature (JP 2011-10408 A) discloses a rotational electric motor having (i) a plate that covers one end of a motor case having a cylindrical shape, and (ii) a controller that is disposed on a side of the plate opposite to the motor case. In the rotational electric machine of the Patent Literature, the winding wire and the controller are electrically connected to each other through a wire extending portion. The wire extending portion is inserted into an insert hole formed in the plate that covers the one end of the motor case.

According to the study by inventors of the present disclosure, in the rotational electric machine of the Patent Literature, one end of the wire extending portion opposite to the winding wire is connected to a substrate of the controller on a side of the substrate close to the plate (i.e., a side facing the plate). Thus, a work space to connect the wire extending portion to the controller is needed on the side of the substrate close to the plate. Accordingly, the size of the rotational electric machine including the controller may be increased.

Further, in the rotational electric machine of the Patent Literature, sputtering, a solder ball or the like, which is generated when electrically connecting the wire extending portion to the controller, may adhere to components on the side of the substrate close to the plate inside the rotational electric machine. Hence, it may be difficult to remove metallic foreign matters, such as sputtering or solder balls. As a result, a short circuit fault may occur inside the rotational electric machine.

Furthermore, a plurality of insert holes are formed in the plate, and the wire extending portions are inserted into the respective insert holes. Thus, the wire extending portions are electrically connected to the controller at plural positions on the controller in a circumferential direction of the plate. As such, the above-mentioned disadvantages may be prominently exhibited, and the number of steps for forming the insert holes in the plate and for electrically connecting the wire extending portion to the controller may be increased. Further, the risk of entry of a foreign matter into the motor case through the insert holes may be also increased.

SUMMARY

It is an objective of the present disclosure to provide a rotational electric machine having a small size while being easily manufactured.

In an aspect of the present disclosure, a rotational electric machine including a motor, a first plate, a second plate, a wire extending portion and a controller.

The motor includes a motor case, a stator, a winding wire, a rotor and a shaft. The stator is disposed inside the motor case. The winding wire is wound around the stator. The rotor is rotatably disposed inside the stator. The shaft is disposed in a rotational center of the rotor.

The motor includes a motor case, a stator, a winding wire, a rotor and a shaft. The first plate covers one side of the motor case and rotatably supports one end portion of the shaft. The second plate has an insert hole extending in a thickness direction of the second plate. The second plate covers an other side of the motor case and rotatably supports an other end portion of the shaft. The wire extending portion has one end electrically connected to the winding wire. The wire extending portion extends from the winding wire and is inserted into the insert hole.

The controller is disposed on a side of the second plate opposite to the motor case. The controller includes a substrate. The controller is electrically connected to an other end of the wire extending portion at a side of the substrate opposite to the second plate or at the substrate, and controls energization to the winding wire.

According to the aspect of the present disclosure, the wire extending portion that is connected to the winding wire is inserted into the insert hole of the second plate, and the other end of the wire extending portion is electrically connected to the controller at the side of the substrate opposite to the second plate or at the substrate. Thus, there is no need to form a work space at a side of the substrate close to the second plate so as to electrically connect the other end of the wire extending portion to the controller. As a result, it is possible to suppress an increase in the size of the rotational electric machine that integrally has the motor and the controller.

Further, the other end of the wire extending portion is electrically connected to the controller at the side of the substrate opposite to the second plate or at the substrate. Thus, it is possible to suppress sputtering or solder balls to adhere to components at a side of the substrate close to the second plate inside the rotational electric machine. Therefore, metallic foreign matters such as sputtering or solder balls can be easily removed. As a result, it is possible to easily manufacture the rotational electric machine, in which the occurrence of a short circuit fault inside the rotational electric machine can be suppressed.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

A plurality of embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

Figure 1:
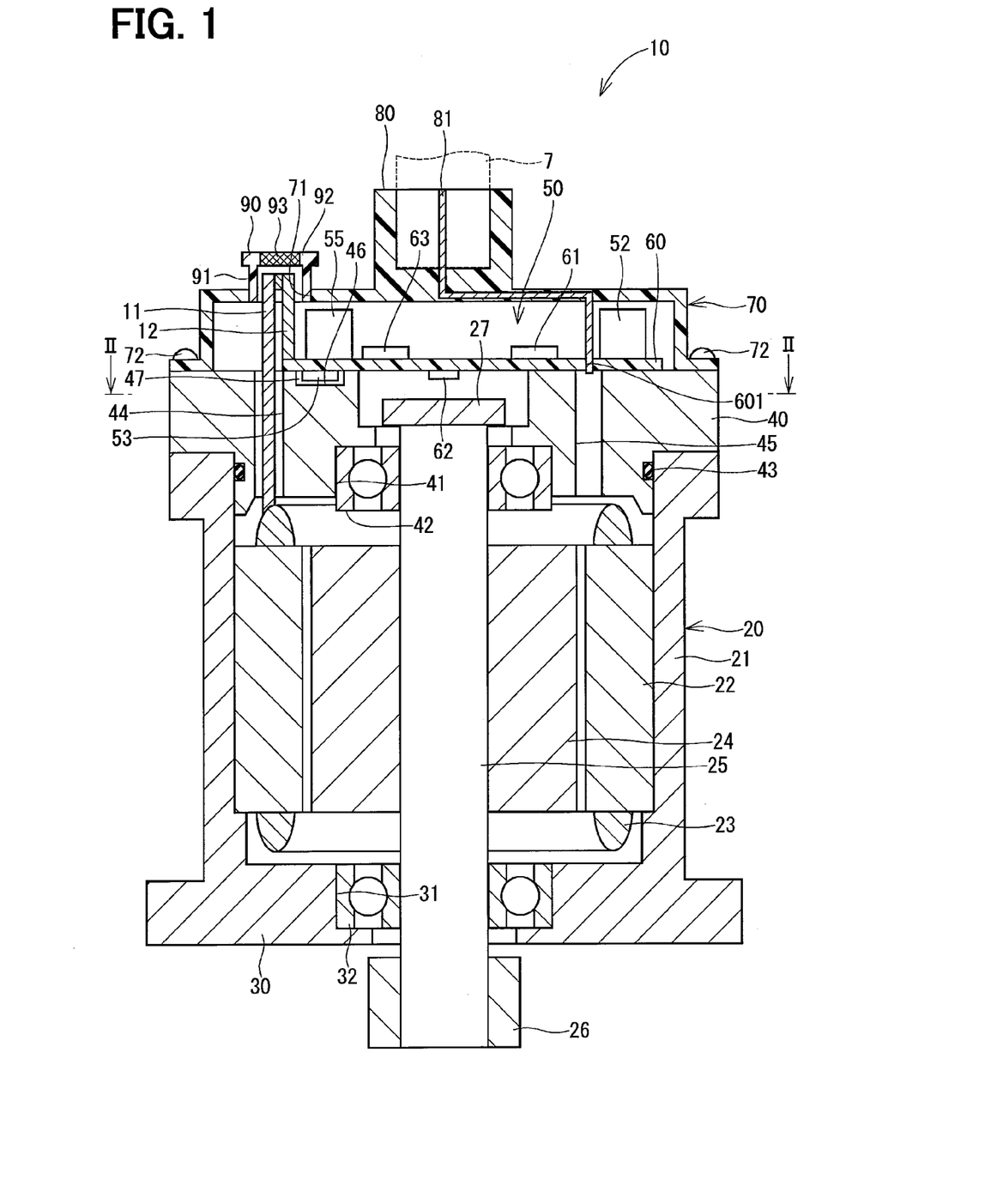
FIG. 1 is a cross-sectional view schematically illustrating a rotational electric machine.
Figure 2:
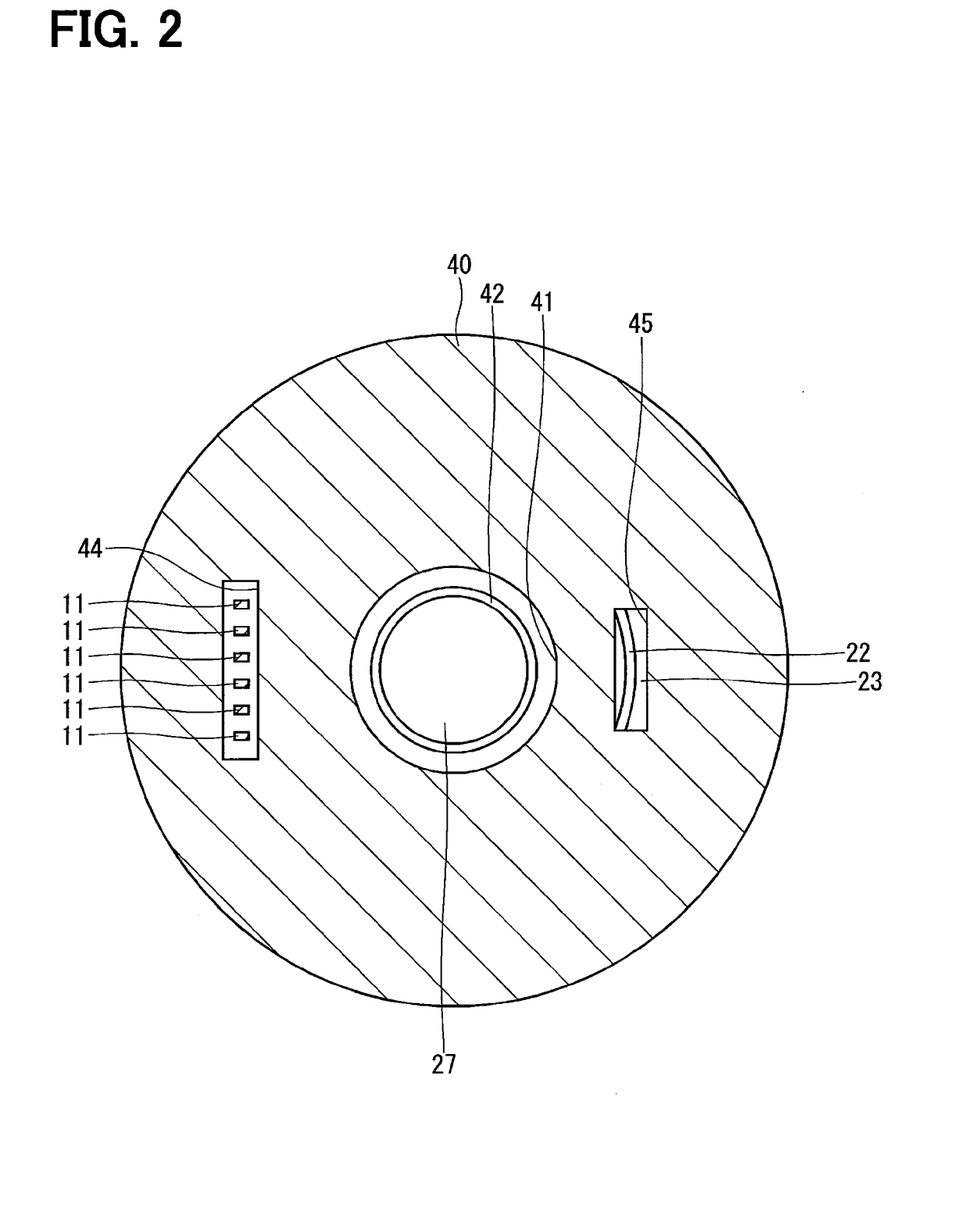
FIG. 2 is a cross-sectional view taken along II-II line in FIG. 1.
Figure 3:
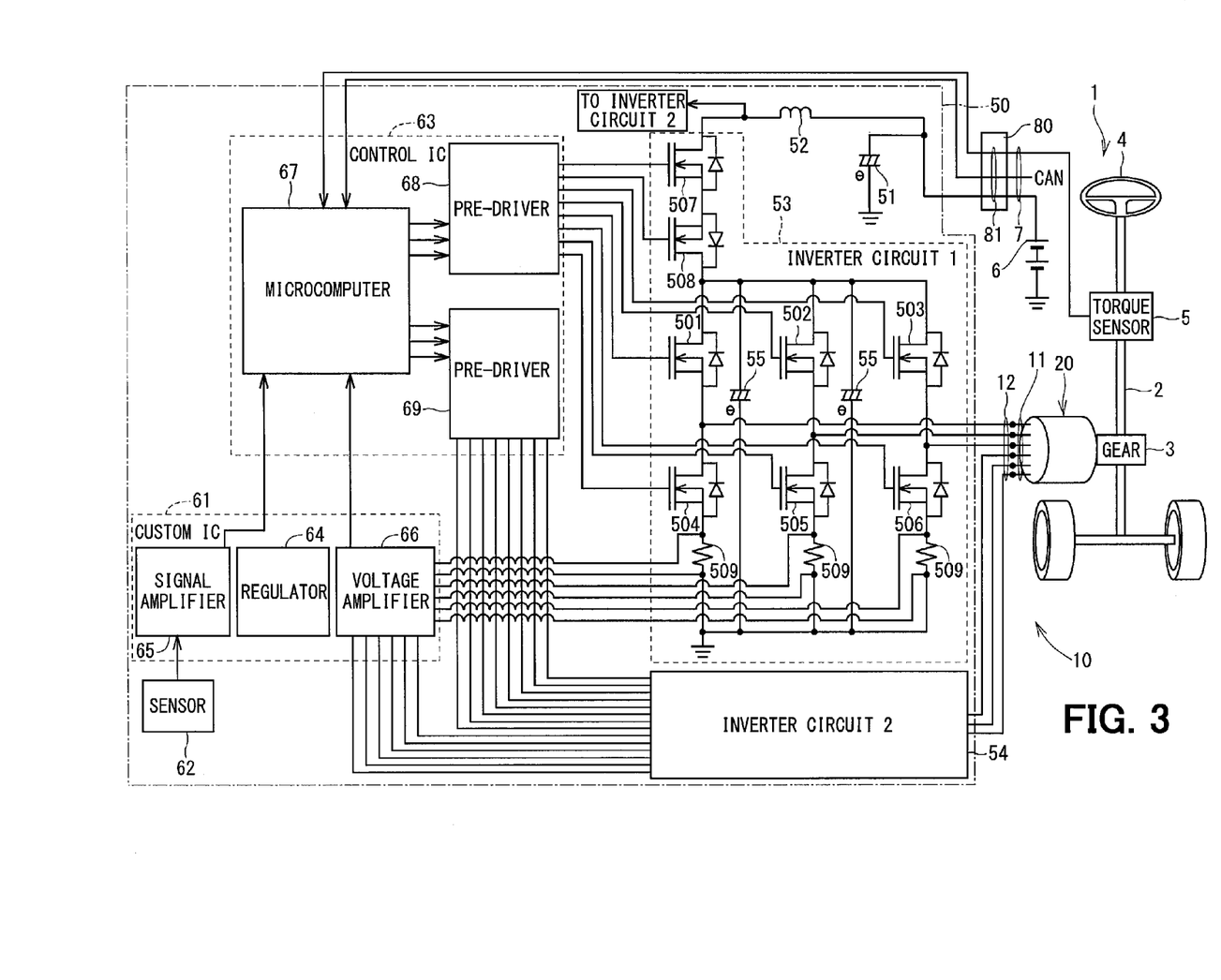
FIG. 3 is a circuit configuration of the rotational electric machine.

FIGS. 1 and 2 illustrate a rotational electric machine according to the first embodiment. As shown in FIG. 3, the rotational electric machine 10 is used as a driving part for an electric power steering device 1 that is mounted to a vehicle. The rotational electric machine 10 is provided such that an end portion (output end 26) of a shaft 25 of a motor 20, as described below, engages a gear 3 of a gear box attached to a column shaft 2. The rotational electric machine 10 generates an assisting force for steering of the vehicle. Specifically, the rotational electric machine 10 generates the assisting force by driving the motor 20 in a forward or backward direction based on a torque signal output from a torque sensor 5 that detects a steering torque of a steering wheel 4, a vehicle speed signal from a CAN (Controller Area Network (not shown)), or the like. As described above, in the present embodiment, a column assist type electric power steering device is used as the electric power steering device 1.

As shown in FIG. 1, the rotational electric machine 10 includes the motor 20, a magnet 27, a first plate 30, a second plate 40, a plurality of wire extending portions 11, a controller 50, a plurality of terminal members 12, a cover 70, a connector 80, a connector terminal 81, a cap 90, or the like.

The motor 20 includes a motor case 21, a stator 22, a winding wire 23, a rotor 24, the shaft 25, or the like.

The motor case 21 is formed into a cylindrical shape and is made of metal, such as aluminum.

The stator 22 is formed into a substantially annual shape and is made of, for example, a laminated steel plate. The stator 22 is fixed inside the motor case 21.

The winding wire 23 is made of metal, such as copper, and is wound around the stator 22. In the present embodiment, the winding wire 23 corresponds to a U-phase, a V-phase and a W-phase.

The rotor 24 is formed into a substantially columnar shape and is made of a laminated steel plate, as with the stator 22. The rotor 24 is rotatably disposed inside the stator 22. A plurality of magnets (not shown) are disposed on an outer wall of the rotor 24. The magnets have an N-pole or an S-pole and the N-pole magnet and the S-pole magnet are arranged alternately with given intervals in a circumferential direction of the rotor 24.

The shaft 25 is linearly formed and is made of, for example, metal. The shaft 25 is disposed in a rotational center of the rotor 24.

The shaft 25 has the output end 26 at one end portion of the shaft 25. The output end 26 engages the gear 3 of the electric power steering device 1. The shaft 25 has the magnet 27 on the other end portion of the shaft 25. The magnet 27 generates magnetic flux. The magnet 27 may provide "magnetic flux generator".

The first plate 30 is formed into a plate shape and is made of metal, such as aluminum. The first plate 30 is integrally formed with the motor case 21 and the first plate 30 covers one side of the motor case 21. A shaft hole 31 is formed at a center of the first plate 30. A bearing member 32 is disposed in the shaft hole 31. The bearing member 32 rotatably supports one end portion of the shaft 25. That is, the one end portion of the shaft 25 is rotatably supported by the first plate 30 through the bearing member 32.

The second plate 40 is formed into a plate shape and is made of metal, such as aluminum. The second plate 40 is separately formed from the motor case 21, and the second plate 40 covers the other side of the motor case 21. The motor case 21 is fully in contact with the second plate 40 in the circumferential direction of the motor case 21. A shaft hole 41 is formed at a center of the second plate 40. A bearing member 42 is formed in the shaft hole 41. The bearing member 42 rotatably supports the other end portion of the shaft 25. That is, the other end portion of the shaft 25 is rotatably supported by the second plate 40 through the bearing member 42.

As described above, the one end portion of the shaft 25 is rotatably supported by the first plate 30 and the other end portion of the shaft 25 is rotatably supported by the second plate 40. As such, the rotor 24 is rotatable inside the stator 22 relative to the stator 22.

An annular groove is formed on an outer wall of the second plate 40 facing an inner wall of the motor case 21. A sealing member 43 made of rubber and having an annular shape is disposed in the annular groove (refer to FIG. 1). The sealing member 43 is compressed between the second plate 40 and the motor case 21 in a state where the second plate 40 covers the other side of the motor case 21. Accordingly, a space between the second plate 40 and the motor case 21 is maintained in an air-tightly or liquid-tightly sealed state by the sealing member 43.

As shown in FIGS. 1 and 2, an insert hole 44 and a hole 45 are formed in the second plate 40 at a position radially inward of the sealing member 43. The insert hole 44 and the hole 45 extend in a thickness direction of the second plate 40. An inside space of the motor case 21 is communicated with an outside space at a side of the second plate 40 opposite to the motor case 21 through the insert hole 44 and the hole 45 in a state where the second plate 40 covers the other side of the motor case 21.

A recessed portion 46 is formed on a surface of the second plate 40 opposite to the motor case 21, and the recessed portion 46 is recessed from the surface of the second plate 40 toward the motor case 21.

Each wire extending portion 11 is linearly formed and is made of metal, such as copper. The wire extending portion 11 has one end electrically connected to the winding wire 23. The wire extending portion 11 extends from the winding wire 23 and is inserted into the insert hole 44. The one end of the wire extending portion 11 is electrically connected to the winding wire 23 by welding, soldering, or the like. The wire extending portion 11 is disposed not to be in contact with the second plate 40 (the insert hole 44). Further, an outer wall of the wire extending portion 11 is covered with an insulating film.

As shown in FIG. 2, the rotational electric machine 10 of the present embodiment has six wire extending portions 11. A pair of wire extending portions 11 corresponds to each phase (U, V or W-phase) of the winding wire 23. The number of the insert hole 44 is one. Thus, six wire extending portions 11 are inserted into only the insert hole 44.

The controller 50 is disposed on a side of the second plate 40 opposite to the motor case 21. As shown in FIGS. 1 and 3, the controller 50 includes a first capacitor 51, a choke coil 52, a power module 53 as an inverter circuit 1, a power module 54 as an inverter circuit 2, second capacitors 55, a substrate 60, a custom IC (ASIC) 61, a rotational angle sensor 62, a control IC 63, or the like.

As shown in FIG. 3, electric power is supplied to the controller 50 from a battery 6. The first capacitor 51 and the choke coil 52 constitute a filter circuit and suppress noise of the rotational electric machine 10 to transmit to other devices that commonly use the battery 6. Also, the choke coil 52 is connected between the battery 6 and the power modules 53 and 54 in series and suppresses power fluctuation.

The power module 53 is a semiconductor module in which switching elements 501 to 506, power supply relays 507 and 508, shunt resistors 509, or the like, are integrally formed by being covered with a sealing body (not shown) made of, for example, resin.

The switching elements 501 to 506 constitute a MOSFET (metal-oxide-semiconductor field-effect transistor) that is a type of a field effect transistor. Each switching element 501 to 506 is turned ON/OFF between a source and a drain according to a gate voltage.

The drains of the switching elements 501 to 503 on an upper arm are connected to the battery 6, and the sources thereof are connected to the drains of the corresponding switching elements 504 to 506 on a lower arm. The sources of the switching elements 504 to 506 on the lower arm are connected to a circuit ground. The connecting points between the switching elements 501 to 503 and the corresponding switching elements 504 to 506 are electrically connected to the motor 20.

As with the switching elements 501 to 506, the power supply relays 507 and 508 constitute a MOSFET. The power supply relays 507 and 508 are positioned between the switching elements 501 to 506 and the choke coil 52, and cut off a current toward the motor 20 through the switching elements 501 to 506 when system failure occurs.

Each shunt resistor 509 is electrically connected between the respective switching elements 504 to 506 and the circuit ground. A current flowing through the motor 20 can be detected by detecting a voltage or a current applied to the shunt resistor 509.

The description as to the power module 54 is omitted since the configuration of the power module 54 is the same as that of the power module 53 as described above. The power module 53, 54 may provide "semiconductor module".

Each second capacitor 55 is connected between a wiring on a side of the corresponding switching elements 501 to 503 close to the battery 6 and the circuit ground. In other words, the second capacitors 55 are connected to the switching elements 501 to 506 in parallel. The second capacitor 55 stores electric charges and supports the power supply to the switching elements 501 to 506. Further, the second capacitor 55 absorbs a ripple current generated due to current switching.

The custom IC 61 is a semiconductor integrated circuit including a regulator 64, a rotational angle signal amplifier 65, a detected voltage amplifier 66 or the like.

The regulator 64 is a stabilizing circuit to stabilize electric power from the battery 6. The regulator 64 stabilizes electric power supplied to each element. For example, a microcomputer 67 as described below operates with a stabilized voltage (e.g., 5V) by the regulator 64.

A signal is input into the rotational angle signal amplifier 65 from the rotational angle sensor 62. The rotational angle sensor 62 is a magnetic flux detecting element, such as a Hall IC. The rotational angle sensor 62 is disposed on the substrate 60 at a position close to the magnet 27 arranged on the shaft 25 of the motor 20, more specifically, at a position on an axial line of the shaft 25 (refer to FIG. 1). The rotational angel sensor 62 detects magnetic flux generated by the magnet 27, i.e., detects a change of the magnetic flux (magnetic field) around the rotational angle sensor 62. The rotational angle sensor 62 transmits the detected signal to the rotational angle signal amplifier 65 as a signal related to a rotational angle of the motor 20 (the rotor 24). The rotational angle signal amplifier 65 amplifies the signal related to a rotational angle of the motor 20 and transmits the amplified signal to the microcomputer 67 as described below. The rotational angle sensor 62 may provide "flux detector".

The detected voltage amplifier 66 detects a voltage between both ends of the shunt resistor 509 and amplifies the detected voltage. The amplified voltage is transmitted to the microcomputer 67 from the detected voltage amplifier 66.

The control IC 63 is a semiconductor integrated circuit including the microcomputer 67, pre-drivers 68 and 69, or the like.

The microcomputer 67 is a small computer including a CPU as a calculator, a ROM and a RAM, as storage, or the like. The microcomputer 67 executes a variety of processes at the CPU according to a variety of programs stored in the ROM.

The signal related to the rotational angle of the motor 20 from the rotational angle signal amplifier 65, a voltage between both ends of the shunt resistor 509 from the detected voltage amplifier 66, a steering torque signal, and the vehicle speed signal from the CAN are input into the microcomputer 67. The microcomputer 67 controls the power module 53 through the pre-driver 68 based on the rotational angle of the motor 20. Specifically, the microcomputer 67 changes the gate voltage of the switching elements 501 to 506 by the pre-driver 68 to switch ON/OFF of the switching elements 501 to 506, thereby controlling the power module 53.

Further, the microcomputer 67 controls the power module 53 based on the voltage between both ends of the shunt resistor 509 that is input from the detected voltage amplifier 66 such that a wave form of the current supplied to the motor 20 (the winding wire 23) becomes a sine wave. As with the power module 53, the microcomputer 67 also controls the power module 54 through the pre-driver 69.

The microcomputer 67 generates a pulse signal by PVM control through the pre-drivers 68 and 69 based on the signals from the rotational angle sensor 62, the torque sensor 5, and the shunt resistors 509, and the vehicle speed signal from the CAN so as to assist a driver in steering using the steering wheel 4 according to vehicle speed. The pulse signal is output to two inverter circuit systems constituted by the power module 53 and the power module 54. The ON-OFF switching operation of the switching elements 501 to 506 is controlled based on the pulse signal generated by the microcomputer 67. As a result, a sinusoidal current having a different phase flows through each phase of the winding wire 23 of the motor 20, and thus a rotating magnetic field is generated. Accordingly, the rotor 24 and the shaft 25 integrally rotate due to the rotating magnetic field. Hence, a driving force is output from the output end 26 to the gear 3 of the column shaft 2 by the rotation of the shaft 25, whereby the steering by a driver through the steering wheel 4 is assisted.

As described above, the controller 50 has two different power module systems (the power modules 53 and 54) and controls energization to the winding wire 23. Each power module system has the U-phase, the V-phase and the W-phase. The power modules 53 and 54 (the switching elements 501 to 506) generate heat during operation (i.e., switching of the switching elements 501 to 506).

The substrate 60 is a printed circuit board, such as FR-4, that is made of, for example, glass fiber and epoxy resin. As shown in FIG. 1, the substrate 60 is disposed on a side of the second plate 40 opposite to the motor case 21, and the substrate 60 is in parallel to the second plate 40. In the present embodiment, the substrate 60 is fixed to the second plate 40 and is in contact with the second plate 40.

The first capacitor 51, the choke coil 52, the second capacitor 55, the custom IC 61, the control IC 63, or the like are mounted on one surface of the substrate 60 opposite to the second plate 40. The rotational angle sensor 62, the power modules 53 and 54 are mounted on the other surface (a surface) of the substrate 60 close to (i.e., facing) the second plate 40. The rotational angle sensor 62 is positioned on the axial line of the shaft 25. The power modules 53 and 54 are housed inside the recessed portion 46 of the second plate 40.

A heat transfer member 47 is disposed between the power modules 53 and 54 and the recessed portion 46. The heat transfer member 47 is formed by, for example, an insulation radiating heat seat and a thermal grease. The insulation radiating heat seat is an insulating seat with a low thermal resistance including, for example, silicon. The thermal grease is a gel grease with a low thermal resistance having, for example, a silicon substrate. According to this configuration, heat during operation of the power modules 53 and 54 is transferred to the second plate 40 and the motor case 21 through the heat transfer member 47 and then is radiated from the second plate 40 and the motor case 21.

The terminal members 12 are linearly formed and made of metal, such as copper. Each terminal member 12 has one end electrically connected to a printed wiring on the substrate 60 of the controller 50. The printed wiring is electrically connected to the connecting points between the switching elements 501 to 503 on the upper arm and the corresponding switching elements 504 to 506 on the lower arm.

In the present embodiment, six terminal members 12 corresponding to six wire extending portions 11 are provided. Each terminal member 12 is parallel to the corresponding wire extending portion 11. The other end of the wire extending portion 11 opposite to the winding wire 23 is electrically connected to the other end of the terminal member 12 opposite to the substrate 60 by, for example, soldering or welding (refer to FIG. 1). As described above, the other end of the wire extending portion 11 is electrically connected to the controller 50 at a side of the substrate 60 opposite to the second plate 40.

The power modules 53 and 54 and the winding wire 23 are electrically connected each other through the terminal members 12 and the wire extending portions 11, whereby electric power is supplied to the winding wire 23 through the power modules 53 and 54, the terminal members 12 and the wire extending portions 11.

The cover 70 is formed into a disk-like shape and is made of, for example, resin. The cover 70 has an opening 71 in a bottom of the cover 70, and an outside and an inside of the cover 70 are in communication with each other through the opening 71. The cover 70 is disposed on the side of the second plate 40 close to the controller 50, i.e., on the side of the second plate 40 opposite to the motor case 21, and covers the controller 50 therein. The other end of the wire extending portion 11 and the other end of the terminal member 12, i.e., a connecting portion of the wire extending portion 11 and the terminal member 12, are positioned in the opening 71. An outer circumferential periphery of the cover 70 is fixed to the second plate 40 with a plurality of screws 72. Thus, the cover 70 is attached to the second plate 40. The cover 70 can protect the controller 50 from an external impact, dust, or liquid, such as water.

The connector 80 is integrally formed with the cover 70 and is made of, for example, resin. The connector 80 has a cylindrical shape and extends from a center of the cover 70 in a direction away from the controller 50. The connector terminal 81 is made of metal, such as copper. One end of the connector terminal 81 is positioned inside the connector 80 and the other end of the connector terminal 81 is electrically connected to the substrate 60 of the controller 50. The other end of the connector terminal 81 is electrically connected to the substrate 60 through a through hole 601 formed in the substrate 60 at a position corresponding to the hole 45 of the second plate 40.

A harness 7 is connected to the connector 80. Therefore, the harness 7 is electrically connected to the one end of the connector terminal 81. A current from the battery 6, a signal from the CAN and a signal from the torque sensor 5 flow through the harness 7, and thus are supplied to the controller 50 through the connector 80 and the connector terminal 81.

The cap 90 is disposed in the opening 71 of the cover 70. The cap 90 includes a cylinder 91, a plate portion 92, a ventilation portion 93, or the like. The cylinder 91 is formed into a cylindrical shape and is made of, for example, resin. The plate portion 92 is made of, for example, resin and is formed integrally with the cylinder 91. The plate portion 92 covers one side of the cylinder 91. The ventilation portion 93 is made from a film, which is manufactured by stretching, for example, polytetrafluoroethylene, and a moisture-permeable waterproof material, which has a microporous property by compounding a polyurethane polymer. The ventilation portion 93 is disposed in the plate portion 92 and the ventilation portion 93 allows air to flow between the inside and the outside of the cap 90 (the cylinder 91) and prohibits liquid from flowing between the inside and the outside of the cap 90 (the cylinder 91).

The cap 90 is disposed on the cover 70 and the other end of the wire extending portion 11 and the other end of the terminal member 12, i.e., the connecting portion between the wire extending portion 11 and the terminal member 12, are positioned inside the cylinder 91. Further, the cap 90 closes the opening 71. As a result, the other end of the wire extending portion 11 and the other end of the terminal member 12 are covered with the cap 90.

Next, a method for manufacturing the rotational electric machine 10 according to the present embodiment will be described below. The manufacturing method includes steps as below.

(Motor Assembling Step)

Figure 4:
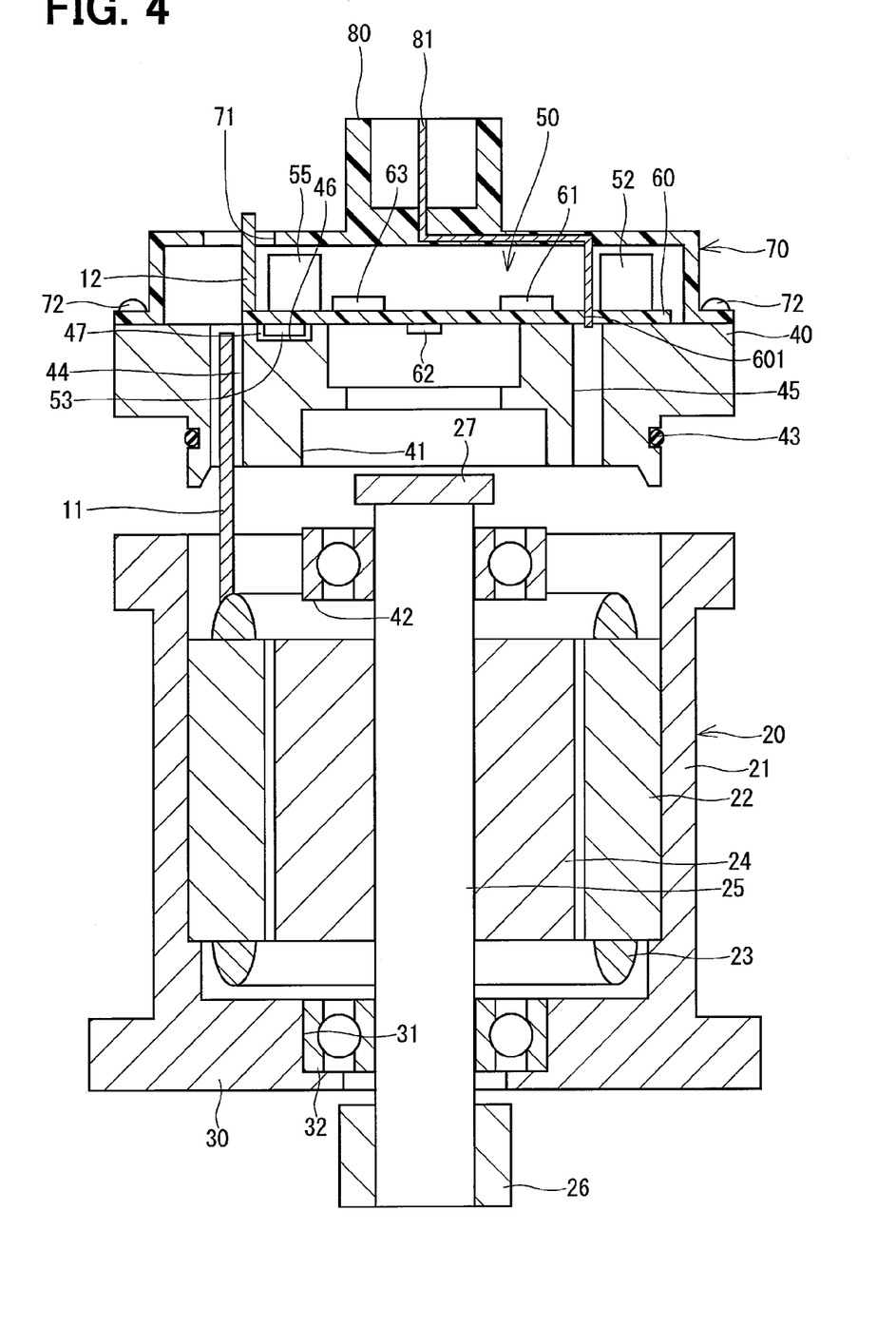
FIG. 4 is a portion of a manufacturing process of the rotational electric machine.

As shown in FIG. 4, the winding wire 23 is wound around the stator 22 and the stator 22 is fixed inside the motor case 21 that is integrally formed with the first plate 30. The bearing member 32 is disposed in the shaft hole 31 of the first plate 30. The one end portion of the shaft 25, to which the rotor 24 is attached, is inserted into the bearing member 32. The output end 26 is attached to the one end portion of the shaft 25. The other end portion of the shaft 25 is inserted into the bearing member 42. The magnet 27 is attached to the other end portion of the shaft 25. The one end of each wire extending portion 11 is electrically connected to the winding wire 23.

(Controller Assembling Step)

As shown in FIG. 4, a variety of electric components are amounted on the substrate 60 and the one end of each terminal member 12 is electrically connected to the substrate 60. The heat transfer member 47 is disposed inside the recessed portion 46 of the second plate 40. The substrate 60 is fixed to the second plate 40 such that the rotational angle sensor 62 is positioned at a center of the shaft hole 41 and the power modules 53 and 54 are housed inside the recessed portion 46. The cover 70 is fixed to the second plate 40 with the screws 72 such that the one end of each terminal member 12 is positioned in the opening 71, and the other end of the connector terminal 81 is inserted into the through hole 601 of the substrate 60. The other end of the connector terminal 81 is electrically connected to the printed wiring of the substrate 60 at the through hole 601 using a soldering tool (not shown) that is inserted through the hole 45. The sealing member 43 is disposed inside the groove on the outer wall of the second plate 40.

(Joining Step)

Figure 5:
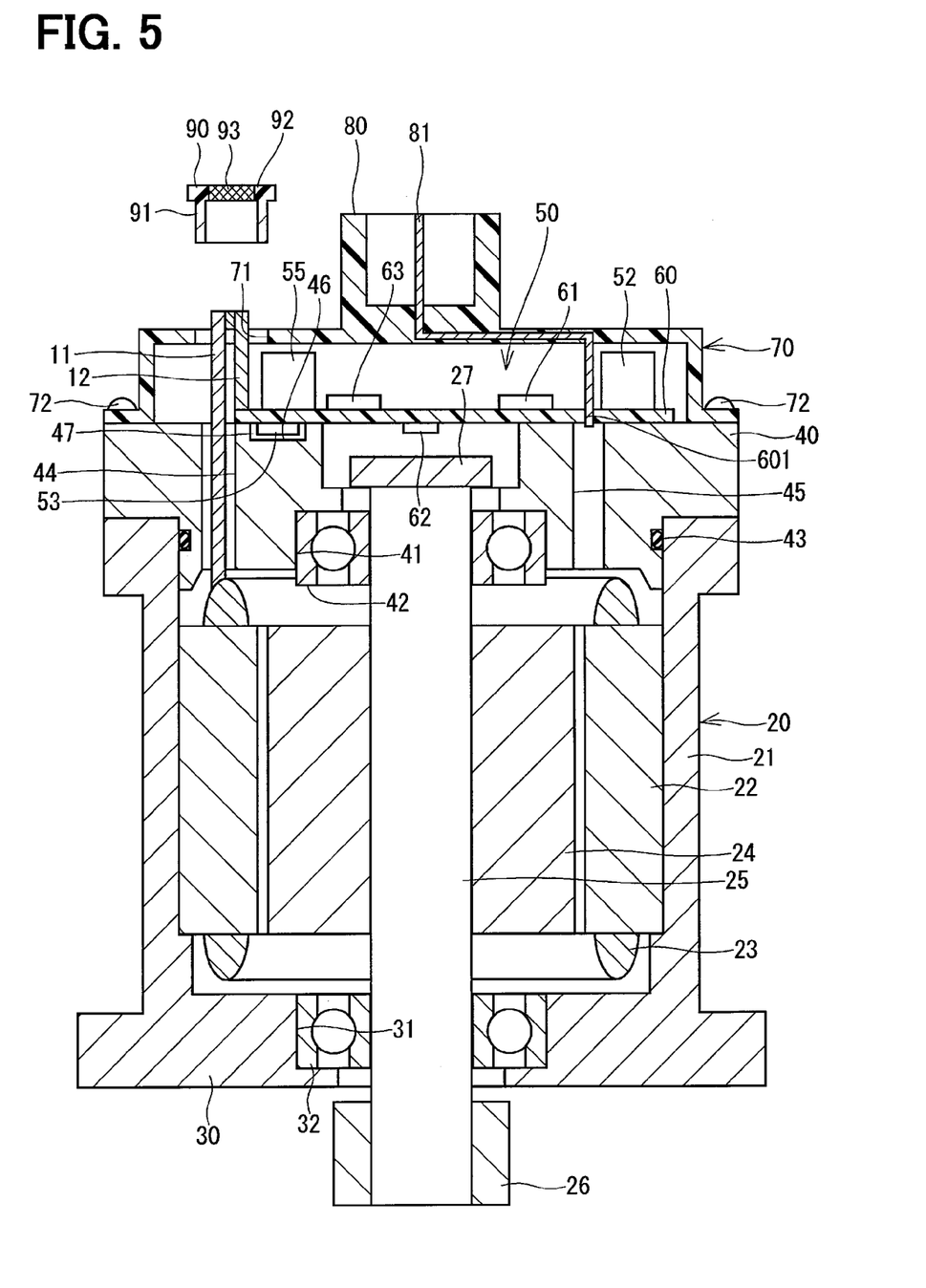
FIG. 5 is a portion of a manufacturing process of the rotational electric machine.

As shown in FIGS. 4 and 5, the motor case 21 is joined with the second plate 40 in a state where the wire extending portions 11 are inserted into the insert hole 44, and the bearing member 42 is press-fitted into the shaft hole 41. As a result, the other ends of six terminal members 12 are positioned close to the other ends of six wire extending portions 11 in the opening 71.

(Terminal Member Connecting Step)

The other end of the terminal member 12 is electrically connected to the other end of the corresponding wire extending portion 11 using the soldering tool from an outside of the cover 70.

(Cap Assembling Step)

As shown in FIGS. 1 and 5, the cap 90 is fitted into the opening 71 of the cover 70 such that the connecting portion of the other end of each terminal member 12 and the other end of each wire extending portion 11 is positioned inside the cylinder 91.

As described above, according to the present embodiment, the motor 20 includes the motor case 21, the stator 22, the winding wire 23, the rotor 24 and the shaft 25. The stator 22 is disposed inside the motor case 21 having the cylindrical shape. The winding wire 23 is wound around the stator 22. The rotor 24 is rotatably disposed inside the stator 22. The shaft 25 is disposed in the rotational center of the rotor 24.

The first plate 30 covers the one side of the motor case 21 and rotatably supports the one end portion of the shaft 25. The second plate 40 has the insert hole 44 extending in the thickness direction of the second plate 40. The second plate 40 covers the other side of the motor case 21 and rotatably supports the other end portion of the shaft 25. The wire extending portion 11 has the one end electrically connected to the winding wire 23. The wire extending portion extends from the winding wire 23 and is inserted into the insert hole 44.

The controller 50 is disposed on the side of the second plate 40 opposite to the motor case 21. The controller 50 includes a substrate 60, and the controller 50 is electrically connected to the other end of the wire extending portion 11 at the side of the substrate 60 opposite to the second plate 40, whereby the controller 50 controls energization to the winding wire 23.

As described above, the wire extending portion 11 connected to the winding wire 23 is inserted into the insert hole 44 and the other end of the wire extending portion 11 is electrically connected to the controller 50 at the side of the substrate 60 opposite to the second plate 40. Accordingly, there is no need to form a work space at the side of the substrate 60 close to the second plate 40 so as to electrically connect the other end of the wire extending portion 11 to the controller 50. As a result, an increase in the size of the rotational electric machine 10, which integrally has the motor 20 and the controller 50, can be suppressed.

Further, since the other end of the wire extending portion 11 is electrically connected to the controller 50 at the side of the substrate 60 opposite to the second plate 40, sputtering, a solder ball, or the like, which are generated when electrically connecting the other end of the wire extending portion 11 to the controller 50, can be suppressed to adhere to components on the side of the substrate 60 close to the second plate 40. As such, it is possible to easily remove metallic foreign matters, such as sputtering or solder balls. Therefore, an occurrence of a short circuit fault can be suppressed in the rotational electric machine 10, while easily manufacturing the rotational electric machine 10.

According to the present embodiment, the number of the insert hole 44 that is formed in the second plate 40 is one. Thus, the number of the processes for forming the insert hole 44 and for electrically connecting the other end of the wire extending portion 11 to the controller 50 can be reduced. Further, the risk of entry of a foreign matter into the motor case 21 through the insert hole 44 can be suppressed.

According to the present embodiment, the cover 70 is disposed on the side of the second plate 40 opposite to the motor case 21 (i.e., the side close to the controller 50) to cover the controller 50. As such, the controller 50 can be protected from an external impact, dust, or liquid, such as water, by the cover 70.

According to the present embodiment, the connector 80 is integrally formed with the cover 70, and the harness 7 is connected to the connector 80 to supply electric power to the winding wire 23. The connector terminal 81 has the one end positioned inside the connector 80 and electrically connected to the harness 7. The connector terminal 81 has the other end electrically connected to the controller 50 at the through hole 601. The second plate 40 has the hole 45 at the position corresponding to the other end of the connector terminal 81. The hole 45 provides an inner connecting work space where the other end of the connector terminal 81 is electrically connected to the controller 50 using, for example, a soldering tool. Accordingly, the other end of the connector terminal 81 can be electrically connected to the controller 50 using the hole 45 after the controller 50 and the cover 70 are attached to the second plate 40, for example.

According to the present embodiment, the terminal member 12 extends from the controller 50 in the direction away from the second plate 40. The terminal member 12 has the one end electrically connected to the controller 50 and the other end electrically connected to the other end of the wire extending portion 11. Therefore, the other end of the wire extending portion 11 can be electrically connected to the controller 50 through the terminal member 12 at a position further away from the second plate 40.

According to the present embodiment, the cover 70 has the opening 71 in which the other end of the wire extending portion 11 and the other end of the terminal member 12 are positioned. Thus, the other end of the wire extending portion 11 and the other end of the terminal member 12 can be electrically connected to each other in the opening 71 after the motor case 21, the second plate 40, the controller 50 and the cover 70 are assembled, for example. Accordingly, a work space for connecting the other end of the wire extending portion 11 to the other end of the terminal member 12 is not required inside the rotational electric machine 10. Further, it is possible to suppress sputtering or solder balls, which is generated when electrically connecting both other ends of the wire extending portion 11 and the terminal member 12, to adhere to an inside of the rotational electric machine 10.

According to the present embodiment, the cap 90 covers the other end of the wire extending portion 11 and the other end of the terminal member 12 The cap 90 closes the opening 71. Hence, the connecting portion of the other end of the wire extending portion 11 and the other end of the terminal member 12 can be protected by the cap 90, and entry of dust or liquid, such as water, into the cover 70 through the opening 71 can be suppressed.

According to the present embodiment, the cap 90 includes the ventilation portion 93 that allows gas to flow between the inside and the outside of the cap 90 and prohibits liquid from flowing between the inside and the outside of the cap 90. The ventilation portion 93 is made of, for example, a moisture-permeable waterproof material. Therefore, it is possible to suppress liquid, such as water, to flow into the cover 70 through the opening 71 while properly maintaining humidity inside the cover 70.

According to the present embodiment, the controller 50 includes the power modules 53 and 54 that are mounted on the substrate 60. The power modules 53 and 54 control energization to the winding wire 23. That is, two inverter circuit systems are provided in the present embodiment. As such, if there is an abnormality in one inverter circuit system, the rotational electric machine 10 can still operate by the other inverter circuit system.

It should be noted that, since two inverter circuit systems are provided in the present embodiment, a heat amount generated during operation of the rotational electric machine 10 may tend to be relatively large. Further, since the rotational electric machine 10 is a three-phase drive type having two inverter circuit systems, the number of electrical connecting points of the winding wire 23 (the wire extending portion 11) and the controller 50 may tend to be large. However, according to the present embodiment, the number of the insert hole 44, which is formed in the second plate 40, is only one. Hence, the number of the processes for electrically connecting the wire extending portion 11 to the controller 50 can be reduced while having the plural inverter circuit systems. Further, the risk of entry of a foreign matter into the motor case 21 through the insert hole 44 can be also suppressed.

According to the present embodiment, the power modules 53 and 54 are amounted on the surface of the substrate 60 close to (i.e., facing) the second plate 40. Thus, heat generated during operation from the power modules 53 and 54 can be efficiently transferred to the second plate 40 and the heat can be radiated from the second plate 40.

According to the present embodiment, the magnet 27 is disposed on the other end portion of the shaft 25 and generates magnetic flux. The controller 50 includes the rotational angle sensor 62 that is mounted on the substrate 60. The rotational angle sensor 62 detects the magnetic flux generated by the magnet 27. The substrate 60 is disposed on the second plate 40. That is, the rotational angle sensor 62 is mounted on the substrate 60 that is disposed on the second plate 40 rotatably supporting the other end portion of the shaft 25. Accordingly, the rotational angle sensor 62 can be precisely positioned with respect to the magnet 27 disposed on the other end portion of the shaft 25.

According to the present embodiment, the second plate 40 is formed separately from the motor case 21, and the second plate 40 and the motor case 21 are made of metal. The motor case 21 is fully in contact with the second plate 40 in the circumferential direction of the motor case 21. Therefore, heat from the power modules 53 and 54 can be efficiently transferred to the motor case 21 through the second plate 40, and the heat can be radiated from the motor case 21.

According to the present embodiment, the sealing member 43 is disposed between the second plate 40 and the motor case 21 to air-tightly or liquid-tightly seal between the second plate 40 and the motor case 21. As a result, entry of dust or liquid, such as water, into the motor case 21 through a space between the second plate 40 and the motor case 21 can be suppressed.

According to the present embodiment, the first plate 30 is integrally formed with the motor case 21, and the first plate 30 and the motor case 21 are made of metal. Hence, the number of parts of the rotational electric machine 10 can be reduced. Also, heat generated from the power modules 53 and 54 can be transferred to the first plate 30 through the second plate 40 and the motor case 21 and the heat can be radiated from the first plate 30.

(Second Embodiment)

Figure 6:
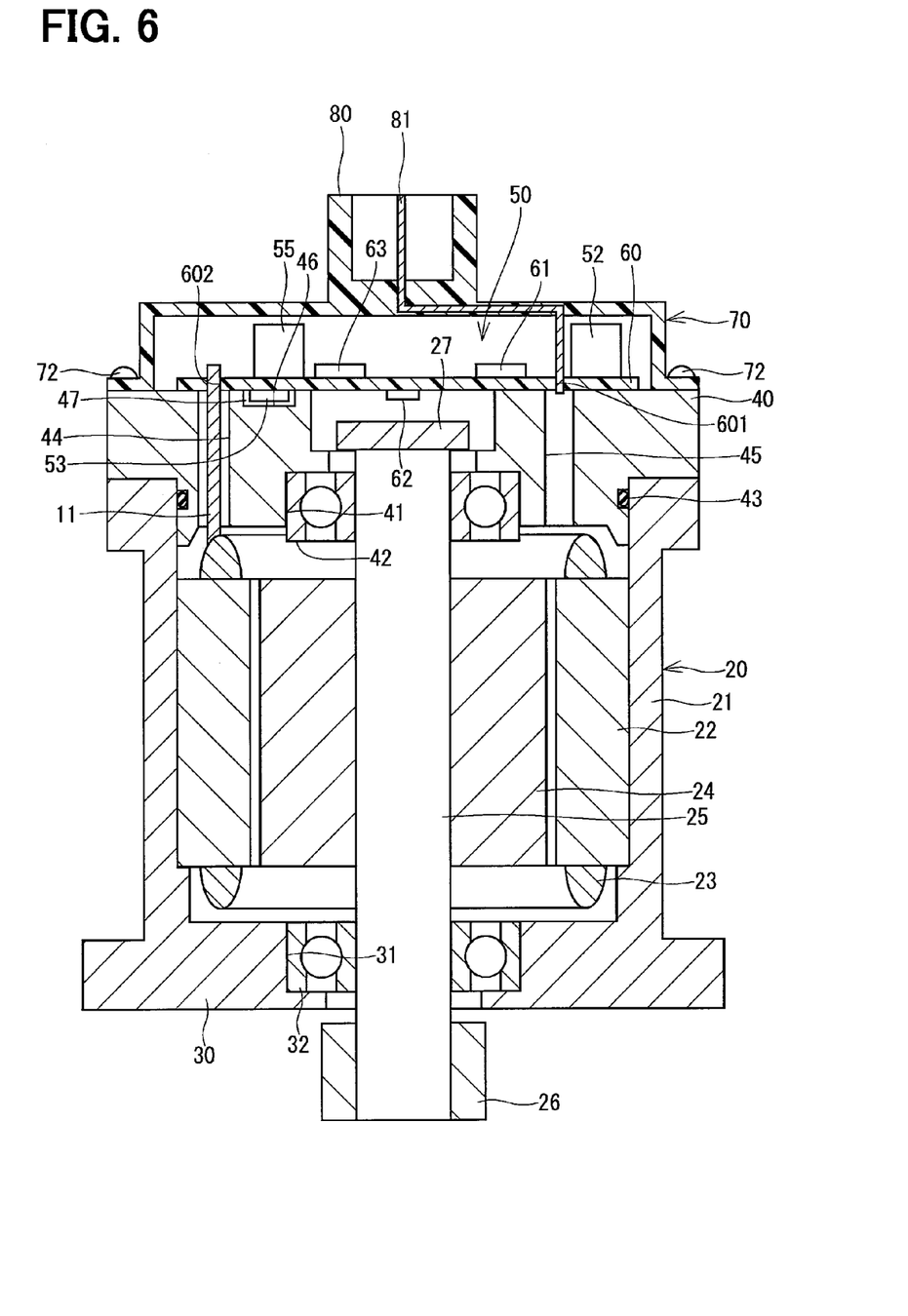
FIG. 6 is a cross-sectional view schematically illustrating another rotational electric machine.

FIG. 6 illustrates a rotational electric machine according to the second embodiment. In the second embodiment, the shape of the wire extending portion 11 and the cover 70 is different from that in the first embodiment.

In the second embodiment, the other end of the wire extending portion 11 is positioned at the through hole 602 of the substrate 60. The other end of the wire extending portion 11 is electrically connected to the printed wiring of the substrate 60 at the through hole 602 by press-fitting. That is, the controller 50 is electrically connected to the other end of the wire extending portion 11.

In the second embodiment, the terminal member 12 described in the first embodiment is eliminated. Further, the cover 70 does not have the opening 71 as described in the first embodiment. The cap 90 in the first embodiment is also eliminated in the second embodiment.

Next, a method for manufacturing the rotational electric machine according to the second embodiment will be described below. The manufacturing method includes steps as below.

(Motor Assembling Step)

Since the motor assembling step in the second embodiment is the same as in the first embodiment, the description of the step is omitted.

(Controller Assembling Step)

The heat transfer member 47 is disposed in the recessed portion 46 of the second plate 40. The substrate 60 is fixed to the second plate 40 such that the rotational angle sensor 62 is positioned at the center of the shaft hole 41 and the power modules 53 and 54 are housed inside the recessed portion 46. Further, the cover 70 is fixed to the second plate 40 with the screws 72 such that the other end of the connector terminal 81 is inserted into the through hole 601 of the substrate 60. The other end of the connector terminal 81 is electrically connected to the printed wiring of the substrate 60 at the through hole 601 using a soldering tool (not shown) that is inserted through the hole 45. The sealing member 43 is disposed inside the groove on the outer wall of the second plate 40.

(Joining Step)

The motor case 21 is joined with the second plate 40 in a state where the wire extending portion 11 is inserted into the insert hole 44, the other end of the wire extending portion 11 is inserted into a through hole 602 formed in the substrate 60, and the bearing member 42 is press-fitted into the shaft hole 41. In this way, the other ends of six wire extending portions 11 are electrically connected to the printed wiring of the substrate 60 at the through hole 602 by press-fitting.

According to the second embodiment, the wire extending portion 11 that is connected to the winding wire 23 is inserted into the insert hole 44 of the second plate 40, and the controller 50 is electrically connected to the other end of the wire extending portion 11 at the substrate 60 (the through hole 602). Therefore, as with the first embodiment, there is no need to form a work space at the side of the substrate 60 close to the second plate 40 so as to electrically connect the other end of the wire extending portion 11 to the controller 50. As a result, an increase in the size of the rotational electric machine, which integrally has the motor 20 and the controller 50, can be suppressed.

According to the second embodiment, the other end of the wire extending portion 11 is electrically connected to the controller 50 by press-fitting. Thus, the wire extending portion 11 can be easily connected to the controller 50 compared to the first embodiment. Further, the number of parts of the rotational electric machine can be less than that in the first embodiment in which the terminal members 12 and the cap 90 are provided. Further, in the second embodiment, there is no need to form the opening 71 in the cover 70 as with the case of the first embodiment, whereby the number of manufacturing process can be also reduced in the second embodiment.

(Third Embodiment)

Figure 7:
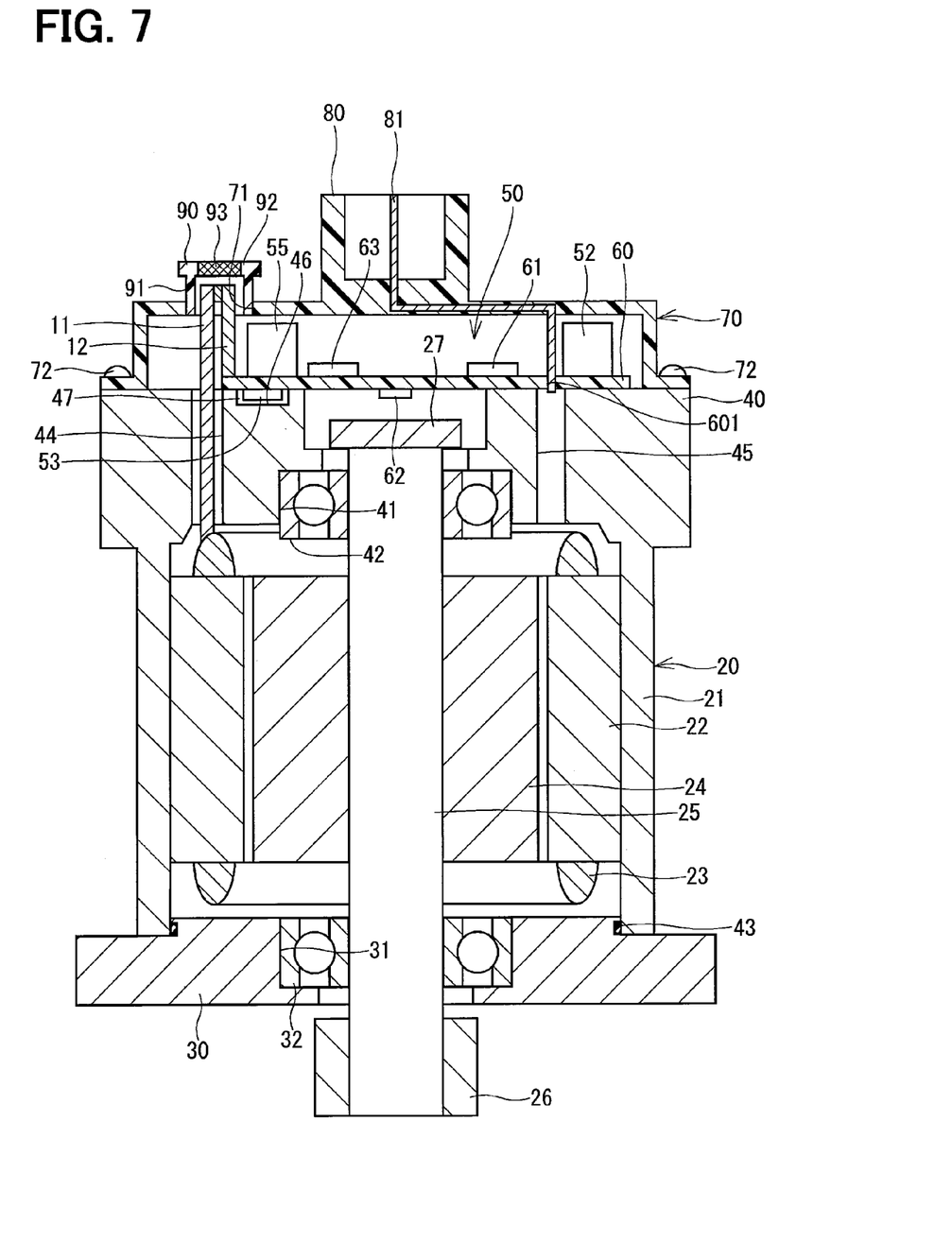
FIG. 7 is a cross-sectional view schematically illustrating further another rotational electric machine.

FIG. 7 shows a rotational electric machine according to the third embodiment. In the third embodiment, the shape of the motor case 21, the first plate 30 and the second plate 40 is different from that in the first embodiment.

In the third embodiment, the first plate 30 is separately formed from the motor case 21, and the first plate 30 covers the one side of the motor case 21. The motor case 21 and the first plate 30 are joined each other such that the motor case 21 is fully in contact with the first plate 30 in the circumferential direction of the motor case 21.

An annular groove is formed on an outer wall of the first plate 30 that faces the inner wall of the motor case 21. A sealing member 43 is disposed in the annular groove (refer to FIG. 7). The sealing member 43 is compressed between the first plate 30 and the motor case 21 in a state where the first plate 30 covers the one side of the motor case 21. Thus, a space between the first plate 30 and the motor case 21 is air-tightly or liquid-tightly sealed by the sealing member 43.

In the third embodiment, the second plate 40 is integrally formed with the motor case 21 and the second plate 40 covers the other side of the motor case 21.

As described above, according to the third embodiment, the first plate 30 is formed separately from the motor case 21, and the first plate 30 and the motor case 21 are made of metal. The motor case 21 is fully in contact with the first plate 30 in the circumferential direction of the motor case 21. Accordingly, heat generated from the power modules 53 and 54 can be efficiently transferred to the first plate 30 through the motor case 21, and the heat can be radiated from the first plate 30.

According to the third embodiment, the sealing member 43 is disposed between the first plate 30 and the motor case 21 to air-tightly or liquid-tightly seal between the first plate 30 and the motor case 21. Hence, it is possible to suppress dust or liquid, such as water, to flow into the motor case 21 through a space between the first plate 30 and the motor case 21.

According to the third embodiment, the second plate 40 is integrally formed with the motor case 21, and the second plate 40 and the motor case 21 are made of metal. Hence, the number of parts of the rotational electric machine can be reduced. Also, heat generated from the power modules 53 and 54 can be transferred to the motor case 21 through the second plate 40, and the heat can be radiated from the motor case 21.

(Other Embodiments)

In a fourth embodiment, the number of the insert holes, into which the wire extending portion is inserted, may be more than one.

In a fifth embodiment, the cover may be eliminated.

In a sixth embodiment, the connector and the connector terminal may be eliminated. Further, the second plate may not have the hole that provides an inner connecting work space where the other end of the connector terminal is electrically connected to the controller.

In a seventh embodiment, the ventilation portion may be configured by forming a plurality of micropores in the cap, for example. The cap may not have the ventilation portion.

In an eighth embodiment, the number of the semiconductor modules (the power modules) may be not only two but also one or more than two. In other words, the rotational electric machine may have not only two inverter systems but also one or more than two inverter systems. Thus, the number of the wire extending portions and the terminals may be not only six but also other than six, respectively.

In the above-described embodiments, a plurality of switching elements 501 to 506 and the power supply relays 507 and 508 are provided in each power module 53, 54. Alternatively, in a ninth embodiment, the power module may be configured by covering with a sealing body each of the plurality of switching elements and each power supply relay, or each pair of the plurality of switching elements and the power supply relays.

In a tenth embodiment, the semiconductor module (the power module) may be mounted on a surface of the substrate opposite to the second plate. The second plate may not have the recessed portion inside which the semiconductor module is housed. The heat transfer member may not be disposed in the recessed portion.

In an eleventh embodiment, the magnetic flux generator may be not provided on the other end portion of the shaft. The controller may not have the magnetic flux detector on the substrate.

In a thirteenth embodiment, at least one of the motor case, the first plate or the second plate may be made of a material other than resin or metal.

In a fourteenth embodiment, the sealing member may not be provided between the second plate or the first plate and the motor case.

In the above-described embodiment, the rotational electric machine has the winding wire of the three-phase type (U-phase, V-phase, W-phase). In a fifteenth embodiment, the winding wire may have n-phase other than three.

In the above-described embodiment, the rotational electric machine is applied to a column assist type electric power steering device. Whereas, in a sixteenth embodiment, the rotational electric machine may be applied to a rack assist type electric power steering device in which an assist torque is applied to a rack shaft.

In a seventeenth embodiment, the rotational electric machine can be used as not only the driver of the electric power steering device but also a driver for driving wheels of a HV vehicle or a driver for instruments that are installed to a certain object other than a vehicle.

It should be noted that the present disclosure may not be only limited to the above-described embodiments. The present disclosure may be applied to other embodiment within the scope of the present disclosure.

What is claimed is:

1. A rotational electric machine comprising:
a motor that includes a motor case having a cylindrical shape, a stator disposed inside the motor case, a winding wire wound around the stator, a rotor rotatably disposed inside the stator, and a shaft disposed in a rotational center of the rotor;
a first plate that covers one side of the motor case, the first plate rotatably supporting one end portion of the shaft;
a second plate that has an insert hole extending in a thickness direction of the second plate, the second plate covering another side of the motor case and rotatably supporting another end portion of the shaft;
a wire extending portion that has one end electrically connected to the winding wire, the wire extending portion extending from the winding wire and being inserted into the insert hole;
a controller that is disposed on a side of the second plate opposite to the motor case, the controller including a substrate;
a cover that is disposed on the side of the second plate opposite to the motor case to cover the controller, the cover being formed separately from the second plate;
a connector that is integrally formed with the cover from a same material as the cover, a harness being connected to the connector to supply electric power to the winding wire, and
a connector terminal that has one end positioned inside the connector and electrically connected to the harness, the connector terminal having another end electrically connected to the controller, wherein
the controller is electrically connected to another end of the wire extending portion at a side of the substrate opposite to the second plate or at the substrate, and controls energization to the winding wire,
the second plate is formed of metal and has a terminal hole at a position corresponding to the other end of the connector terminal, the terminal hole providing an inner connecting work space where the other end of the connector terminal is electrically connected to the controller,
the substrate is fixed to the second plate so as to abut a surface of the second plate opposite to the motor case,
the one end of the connector terminal and the second plate are positioned on opposite sides of the substrate, and
the other end of the connector terminal passes through a throughhole formed in the substrate to be electrically connected to the substrate, the throughhole of the substrate being formed at a position corresponding to the terminal hole of the second plate.

2. The rotational electric machine according to claim 1, wherein
a number of the insert hole is one.

3. The rotational electric machine according to claim 1, wherein
the other end of the wire extending portion is electrically connected to the controller by press-fitting.

4. The rotational electric machine according to claim 1, further comprising
a terminal member that extends from the controller in a direction away from the second plate, the terminal member having one end electrically connected to the controller and an other end electrically connected to the other end of the wire extending portion.

5. The rotational electric machine according to claim 4, wherein
the cover has an opening in which the other end of the wire extending portion and the other end of the terminal member are positioned.

6. The rotational electric machine according to claim 5, further comprising
a cap that covers the other end of the wire extending portion and the other end of the terminal member, the cap closing the opening.

7. The rotational electric machine according to claim 6, wherein
the cap includes a ventilation portion that allows gas to flow between an inside and an outside of the cap and prohibits liquid from flowing between the inside and the outside of the cap.

8. The rotational electric machine according to claim 1, wherein
the controller includes a plurality of semiconductor modules that are mounted on the substrate, the plurality of semiconductor modules controlling the energization to the winding wire.

9. The rotational electric machine according to claim 8, wherein
the plurality of semiconductor modules are mounted on a surface of the substrate close to the second plate.

10. The rotational electric machine according to claim 1, further comprising
a magnetic flux generator that is disposed on the other end portion of the shaft, the magnetic flux generator generating magnetic flux, wherein
the controller includes a magnetic flux detector that is mounted on the substrate, the magnetic flux detector detecting the magnetic flux generated by the magnetic flux generator, and
the substrate is disposed on the second plate.

11. The rotational electric machine according to claim 1, wherein
the second plate or the first plate is formed separately from the motor case, and
the second plate or the first plate and the motor case are made of metal, wherein
the motor case is fully in contact with the second plate or the first plate in a circumferential direction of the motor case.

12. The rotational electric machine according to claim 11, further comprising
a sealing member that is disposed between the second plate or the first plate and the motor case to air-tightly or liquid-tightly seal between the second plate or the first plate and the motor case.

13. The rotational electric machine according to claim 1, wherein
the first plate or the second plate is integrally formed with the motor case, and the first plate or the second plate and the motor case are made of metal.

14. The rotational electric machine according to claim 1, wherein
the hole in the second plate extends in a direction from the substrate toward the connector.

15. The rotational electric machine according to claim 1, wherein
the same material forming both of the connector and the cover is resin.

* * * * *